United States Patent Office 3,796,631
Patented Mar. 12, 1974

3,796,631
PROCESSES FOR PREPARING
POLYNUCLEOTIDES
Jean Choay and Mireille Sakouhi, Paris, France, assignors to Choay S.A., Paris, France
No Drawing. Filed Nov. 9, 1971, Ser. No. 197,118
Claims priority, application France, Nov. 9, 1970, 7040268; Germany, Dec. 5, 1970, P 20 59 937.5
Int. Cl. C12d 13/06
U.S. Cl. 195—28 N
11 Claims

ABSTRACT OF THE DISCLOSURE

The corresponding nucleotides are polymerized in the presence of a phosphorylase polynucleotide enzyme which is added to the medium in successive fractions at intervals of time each corresponding substantially to the time necessary for the complete development of the phase of the reaction which follows the addition of the preceding enzyme fraction. It applies particularly to the preparation of "Poly I" and "Poly C."

---

The invention relates to improvement in processes for the preparation of polynucleotides, especially of poly (inosine monophosphate), of poly (cytidine monophosphate), of poly (adenosine monophosphate) and of poly (uridine monophosphate), generally and respectively called "Poly I," "Poly C," "Poly A" and "Poly U," by enzymatic polymerization, respectively, of inosine diphosphate (IDP), of cytidine diphosphate (CDP), of adenosine diphosphate (ADP) and of uridine diphosphate (UDP) in the presence of a phosphorylase polynucleotide enzyme, of magnesium ions and of an initiator generally constituted by a polynucleotide of the same nature as that which it is desired to prepare.

This enzymatic polymerization, which also has the character of an equilibrium reaction, is characterized by a first phase during which the amount of polymer formed increases with time, a second phase where this amount, although substantially at its maximum, remains stationary and, if there is no interruption of the reaction, by a third phase during which there is observed a rapid decrease in the amount of polymer present in the reaction medium. Of course, even if it is possible to act on the speed of the enzymatic polymerization process and on the amount of polymer formed, especially by modifying the ratio of the amounts of substrate to be polymerized to the amounts of enzymes placed in contact with this substrate, the temperature, the pH of the medium, etc., it is much more difficult to affect the molecular weight of the polymers obtained.

It is known however, that it is advantageous in general to obtain polymers of high molecular weight. For example, "Poly I" and "Poly C," when they are mixed in equimolecular proportions in the midst of a medium having a sufficient ionic concentration, form bi-catenary complexes, generally called "Poly I:C," which constitute valuable medicaments for the treatment of certain forms of cancer, such as lymphoblastic leukemias or, in a more general manner, to strengthen the immunitary defenses of the organism, and also to increase the production of interferon medicaments of which the therapeutic action appears to be connected with their molecular weight.

Similarly "Poly A" and "Poly U" form, when they are mixed in equimolecular proportions in the midst of a medium having a sufficient ionic concentration, double-chain complexes generally called "Poly A:U" which have immunotonic properties.

It is an object of the invention to render these processes such that they respond to the various exigencies of practice better than hitherto, especially to make them such that polymers of very high molecular weights can be easily produced thereby.

The method according to the invention is characterized by the introduction of the enzyme necessary for the enzymatic polymerization in successive fractions at interval of time each corresponding substantially to the time necessary for the development of the first phase and, if necessary, of the second phase of the polymerization, which follow the addition of each of these fractions, each of these additions having of course to be carried out before the aforesaid third phase of the enzymatic reaction effected by the preceding fraction is initiated.

It has in fact been observed, on one hand, that the addition of a new fraction of enzyme, at the moment when the reaction produced by the preceding fraction of enzyme reaches approximately its maximum, has the effect of restarting the reaction and, consequently, of retarding all the more the third phase of the reaction, and on the other hand, that the production of the enzymatic polymerization by successive additions of enzyme fractions leads to polymers of much higher molecular weights than if, all other conditions of the reaction being otherwise the same, the polymerization was brought into operation in a single step with a quantity of enzyme corresponding to the sum of the above-mentioned fractions.

According to another feature of the invention, it is noted that there is obtained particularly high yields in polymerization when the amount of the substrate to be polymerized and that of the magnesium salt taking part in the polymerization are used in an initial molar ratio of the order of 1.5.

In one preferred embodiment of the invention, the enzymatic polymerization is effected in the presence of a polynucleotide-phosphorylase enzyme extracted from *Azotobacter vinelandii*, and more particularly of that which is classed under No. 9104 in American Type Culture Collection, 6th edition (1958, Washington, D.C.).

The invention relates also to the application in therapeutics of the bi-catenary complexes, especially of "Poly I:C," obtained from the corresponding polynucleotides prepared in the presence of the *Azotobacter vinelandii* strain, more particularly identified above.

Other features of the invention will appear also in the course of the description which follows, of preferred methods of practicing the invention, which are of course given primarily by way of examples and do not have any limiting nature.

In the examples which follow it is proposed to produce a "Poly I" and a "Poly C" of high molecular weights, by polymerization respectively of IDP and of CDP, in the presence of a polynucleotide-phosphorylase enzyme extracted from a strain of *Azotobacter vinelandii* classed under the number 9104 in "American Type Culture Collection," 6th edition (1958), Washington D.C., by proceeding according to the method of C. D. Thang, Bull. Soc. Chim. Biol., 1967, 49, No. 12, p. 1773.

The active enzymatic fraction obtained is filtered in sterile manner. The specific activity of the enzyme is at this stage 0.35 international unit (IU), the international unit being expressed in the amount of phosphorus liberated per mg. of protein and per hour of incubation.

EXAMPLE 1

The compositions of the initial reaction mixtures are as follows:

(a) For the "Poly I"

| | |
|---|---|
| IDP | 27 g. namely 63.4 mM. |
| Magnesium chloride | 42 mM. |
| Tris 2 M | 486 mM. |

(trihydroxymethyamino-methane acting as a buffer)

| | |
|---|---|
| Enzyme | 8.0 IU. |
| Poly I | 100 mg. |

Water q.s.p. so that the reaction volume is 400 ml.

(b) For the "Poly C"

| | |
|---|---|
| CDP | 27 g. namely 67 mM. |
| Magnesium chloride | 44.5 mM. |
| Tris 2 M | 486 mM. |
| Enzyme | 12.0 IU. |
| Poly C | 200 mg. |

Water q.s.p. so that the reaction volume is 400 ml.

The procedure is similar to obtain "Poly I" and "Poly C."

Incubation of the media follows at 37° C. for 72 hours.

In the course of the incubation, there are added about every 8 hours 1.0 IU of enzyme both for the Poly I and for the Poly C.

All the operations which follow are effected in a sterile medium.

At the end of 72 hours, the reaction is stopped by cooling the mixture to +4° C. and by pouring in 1600 ml. (4 times the volume of the initial medium) of ethanol cooled to −20° C. It is allowed to stand overnight at −20° C. It is centrifuged at 24,000 g. for 30 minutes, the solid product is collected and it is taken out in 400 ml. of sterile twice-distilled water. To the solution obtained there is added 100 ml. of an octanol-chloroform mixture in the proportion 4:1. There is finally obtained 200 ml. of a super cooled aqueous liquid which is reprecipitated by 800 ml. of ethanol cooled −20° C. It is allowed to stand again overnight at −20° C., centrifuged again at 24,000 g. for 30 minutes, the solid products are collected and taken out with 200 ml. of sterile twice-distilled water.

On these 200 ml. of solution, there are carried out several dialyses to eliminate the impurities successively against the following media:

10 l. of NaCl phosphate buffer, for 24 hours
10 l. containing 8 M urea, for 24 hours
10 l. containing 0.05 M EDTA, for 24 hours
10 l. containing 1 M NaCl, for 14 hours
10 l. of bidistilled water which is changed 3 times, during 3 days.

There is then obtained the finished product, namely 11 g. of Poly I and 11.6 g. of Poly C.

The measured molecular weights of these polymers are found to be:

$1.4 \times 10^6$ for the "Poly I"
$1.3 \times 10^6$ for the "Poly C"

It is hence observed that the process, according to the invention, enables polymers to be obtained which have a very high molecular weight. It will be noted in addition that by following the additions of enzymes in this example, there will be obtained polymers having a still higher molecular weight.

EXAMPLE 2

The following method of operation enables polymers with high molecular weights to be obtained. The amounts of the reactants in the initial reaction mixtures are respectively proportional to 1 g. of IDP (2.25 mM.) and to 1 g. of CDP (2.48 mM.):

| Poly I: | Poly C: |
|---|---|
| MgCl₂ (1.55 mM.) | MgCl₂ (1.65 mM.) |
| Tris (18 mM.) | Tris (18 mM.) |
| Enzyme (0.5 IU) | Enzyme (0.75 IU) |
| Water (16 ml.) | Water (16 ml.) |
| Poly I (36 mg.) | Poly C (60 mg.) |

Incubation takes place on a water bath with stirring at 37° C.

At regular intervals (every 12 hours) the enzyme is added at the rate of 0.24 IU per gram of IDP and 0.4 IU per gram of CDP.

Incubation is stopped at the end of 72 hours.

Polymers and proteins are precipitated with 4 volumes of cold absolute alcohol. It is allowed to stand overnight at −20° C. It is centrifuged at 23,000 g. to collect the precipitate. It is dissolved in 16 ml. of bidistilled water, then the solution is deproteinized by the addition of 4 ml. of a 4:1 mixture of chloroform octanol. The operation is repeated three times. Finally the polymer is reprecipitated with 64 ml. of absolute alcohol at −20° C. The precipitate is dissolved (also collected by centrifugation) in 10 ml. of sterile bidistilled water, then successive dialyses are carried out, in contact with the following media:

24 h. in NaCl phosphate buffer
24 h. in 8 M urea
24 h. in 1 M NaCl
48 h. in bidistilled water, renewed 4 times.

EXAMPLE 3

The higher molecular weights obtained by the application of the process according to the invention are established by having recourse to the following comparative tests. In all cases, commencement is from 1.5 gr. of IDP and 0.85 IU of enzyme, the other reactants (magnesium chloride, Tris 2 M and initiator) being used in the same proportions than in Example 2 with respect to IDP.

By proceding with the addition of the enzyme at a single time, there is obtained a Poly I of molecular weight $7.2 \times 10^5$.

When the same amount of enzymes is distributed in 5 successive additions of 0.17 IU at intervals of about 5 hours (total duration of processing: 24 hours), there is obtained a Poly I of molecular weight $9.2 \times 10^5$.

When the same amount of enzymes is distributed in 10 successive additions of 0.85 IU at intervals of about 5 hours (total duration of processing: 48 hours), there is obtained a Poly I of molecular weight $1.5 \times 10^6$.

EXAMPLE 4

The polymerization of 10 grams of IDP is effected in the presence of 5 IU of enzymes of which the addition is effected in 15 times, about every 5 hours (total duration of processing: 60 hours). The other reactants are taken in the same proportions than in the Example 2. There is obtained a Poly I of molecular weight $5.8 \times 10^6$.

EXAMPLE 5

Poly A is prepared from 10 grams of ADP and from 4 IU of enzyme, the addition of the enzyme being distributed over 15 times, about every 5 hours. The reaction is carried out in the presence of the same other reactants as in Example 2, taken in the same proportions with respect to the ADP (the initiator however being constituted by Poly A):

There is obtained a Poly A of which the molecular weight is equal to $1.7 \times 10^6$, this molecular weight being hence much higher than that of known Poly A's which is generally of the order of $6 \times 10^5$ to $7 \times 10^5$.

EXAMPLE 6

Poly U is prepared from 10 grams of UDP and 4 IU of enzyme, the addition of the enzyme being distributed over 15 times, about every 5 hours. The reaction is effected in the presence of the same other reactants as in Example 2, taken in the same proportions with respect to the UDP (the initiator being however constituted by Poly U).

A Poly U is obtained of which the molecular weight is equal to $9.1 \times 10^5$, although the molecuar weight of known Poly U's does not generally exceed $5 \times 10^5$.

The process according to the invention has a very particular interest in the case of the preparation of "Poly I: C," from "Poly I" and "Poly C" obtained in the presence of the polynucleotide-phosphorylase enzyme extracted from *Azotobacter vinelandii*. In particular, the process according to the invention has enabled the obtaining of "Poly I:C" of high molecular weight, very active and devoid of toxicity, which is revealed to be all the more astonishing since it is currently accepted that the activity of known "Poly I:C's" runs parallel with their toxicity.

The following tests have established the absence of endotoxines and of toxicity in the "Poly I:C's" obtained from the substances obtained by the process according to the invention, especially substances obtained by Example 1, and the pharmacological and therapeutic activity of the latter. These "Poly I:C's" have been obtained by an equimolecular mixture of "Poly I" and "Poly C" of Example 1 in the midst of a 0.15 M NaCl solution, 0.01 M of phosphate buffer and of pH 7.4. Preferably the solution is heated at about 37° C. for about half an hour.

Study of toxicity

This study was carried out on normal or adrenalectomized mice, for comparison with the results obtained in mice which have received *S. enteritidis* (Boivin) as endotoxine.

The number of dead animals in 48 hours is observed.

Mice treated with endotoxine (a) Normal mice: The $LD_{50}$ is situated in the neighborhood of 200 mcg.

(b) Adrenalectomized mice: It is observed for the doses:

0.01 mcg. (0 dead mouse in 7)
0.03 mcg. (4 dead mouse in 7)
0.1 mcg. (7 dead mouse in 7)
0.3 mcg. (7 dead mouse in 7)

The toxicity of Endotoxine is hence in this example 6,000 times much higher than with respect to normal mice.

Mice treated with "Poly I:C"

(a) Normal mice: At the dose of 1 mg. by the IV route, no mortality was observed.

(b) Adrenalectomized mice: The mice were treated by the IV route, and received 0.2 ml. of a solution containing the amounts of "Poly I:C" indicated below:

For 25 mcg. (0 dead mouse in 10)
For 50 mcg. (0 dead mouse in 10)
For 100 mcg. (0 dead mouse in 10)
For 200 mcg. (1 dead mouse in 10)

The injection in the adrenalectomized mouse of 200 mcg. only causes the death of one animal in 10, whilst the same dose of endotoxine administered to normal mice causes the death of half the animals. Under these conditions, it may be considered that the "Poly I:C" used in the experiment is devoid of endotoxines.

Toxic action in the mouse

Administration to gestating mice, at the 17th and 18th day of gestation, of *S. enteritidis* causes interruption of normal pregnancy, and death in a large number of foetus.

The results obtained have been compared after administration of "Poly I:C" with the results obtained after administration of endotoxine.

There is indicated below, the dose of endotoxime administered, the number of normal pregnancies with respect to the number of animals who had received the same dose, and the number of curviving foeti 24 hours after administration.

5 mcg: 0/10 normal pregnancies (10 surviving foeti in 65)
5 mcg.: 0/10 normal pregnancies (9 suriviving foeti in 73)
10 mcg.: 0/10 normal pregnancies (0 surviving foeti in 70)

(b) Poly I:C: It is administered at the dosage of 50 mcg. to 5 gestating mice. All the pregnancies proceeded normally. The 35 foeti were living 24 hours after the administration.

Poly I:C hence does not lead, for a dose at least 5 times stronger, to a change in gestation.

STUDY OF THE EFFECT OF "POLY I:C" OBTAINED BY THE PROCESS ACCORDING TO THE INVENTION AS IMMUNITY ADJUVANT

Tests were carried out, on one hand, in Swiss male mice, on the other hand, on C 57 female mice.

(A) Swiss male mice

The animals were divided into three groups:

1 control group (group 1):
1 group receiving red blood cells of sheep (GRM), at the dose of $10^8$ cellules by the IV route (group 2);
1 group receiving the same amount of GRM and in addition 150 mcg. of "Poly I:C" at the dose of 150 mcg. also by the IV route (group 3).

The principle of the test is as follows:
The animals which receive GRM form anti-GRM antibodies in a certain proportion. The animals which also receive "Poly I:C" will have a greater number of antibodies, if the "Poly I:C" truly possesses an action as an immunity additive.

Verification of the hypothesis was effected on the third and on the fifth day, by three different tests:

for the tests (a) and (b) below, the serum of the animals was used
for the test (c) below, the spleen of the animals was used.

(a) Titration of agglutinating power: The serums of the animals from the above-mentioned three groups were placed in contact with the solutions containing the antigen (GRM) in increasing dilutions and the appearance or not of agglutinins was observed of which the amount enables the degree of response of the organisms of the treated mice to be estimated with regard to the antigen.

There were observed in the three groups the results indicated in the table below. These results are expressed by the degree of dilution of the serum of the treated mice for which the formation of agglutinins is again observed.

| | Dilution ratio on the— | |
|---|---|---|
| | 3rd day | 5th day |
| Group 1 (controls) | 0 | 0 |
| Group 2 (mice having received only GRM) | 1/8 | 1/128 |
| Group 3 (mice having received GRM and "Poly I:C") | 1/256 | 1/256 |

This table enables it to be appreciated that the animals of group 3, which had received "Poly I:C" at the same time as the antigen, have developed anti-bodies much more rapidly and in greater number than the animals of group 2 which had only previously received the antigen alone.

(b) Measurement of the increase in the formation of rosettes: The serum containing the anti-bodies is placed in contact with the solution containing the antigen, and there is observed what is the quantity of rosettes formed for 1,000 cellules GRM.

|  | Results of the— | |
|---|---|---|
|  | 3rd day | 5th day |
| Control | 0.1 for 1,000 | 0.2 for 1,000. |
| Control plus GRM | 0.7 for 1,000 | 13.6 for 1,000. |
| Control plus GRM plus Poly I:C | 3.3 for 1,000 | 24.4 for 1,000. |

In conclusion, the number of rosettes formed is much greater and in much earlier manner in the serum of the animals which had received "Poly I:C."

(c) Formation of plates in the spleen: The spleen of the animal is removed and sectioned, and the number of plates formed per $10^8$ spleen cells counted. The formation of plates corresponds to the increase in the number of anti-body forming cellules.

|  | Results of the— | |
|---|---|---|
|  | 3rd day | 5th day |
| Control | Of the order of 10. | Of the order of 10. |
| Control plus GRM | 30 | 100. |
| Control plus GRM plus Poly I:C | 1,030 | 800. |

In conclusion, the number of plates is much greater and more advanced for the spleens of animals which had received Poly I:C.

The very large number of rosettes and of plates respectively observed in the two preceding tests, establish the much greater resistance of the organisms of the animals treated with "Poly I:C" with respect to the antigen.

(B) Female C 57 mice

The same results, as regards the latter test, have been obtained in female C 57 mice, which were divided into groups in the following manner:

1 group receiving GRM
1 group receiving GRM+Poly I at the dose of 300 mcg., by the IV route
1 group receiving GRM+Poly I at the dose of 150 mcg., by the IV route
1 group receiving GRM+Poly I:C, at the dose of 300 mcg., by the IV route At the end of three days the following results were observed:

Groups: Number of plates at the 3rd day
  GRM ............................................ 224
  GRM+Poly I, 300 mcg. .................... 268
  GRM+Poly I:C, 150 mcg. ................. 332
  GRM+Poly I:C, 300 mcg. ................. 510

In conclusion, the number of plates is greater in the spleens of animals which have received Poly I:C than in the spleens of animals which were not treated, and it increases with the quantity of Poly I:C which the animals have received.

As is self-evident, and as emerges already from the foregiong, the invention is in no way limited to those of its methods of application, nor to those of its methods of production of its various parts, which have been more particularly indicated; it encompasses, on the contrary, all varaitions.

We claim:

1. In the process for the enzymatic synthesis of polynucleotides from corresponding nucleoside diphosphates in the presence of an initiator constituted by the polynucleotide to be formed, of a phosphorylase polynucleotide enzyme and of a magnesium salt, in an aqueous medium at a suitable pH and incubation temperature the improvement comprising adding the enzyme in successive fractions of the complete amount of enzyme at moments of time when the reaction produced by the preceding enzyme fraction reaches approximately its maximum.

2. Process according to claim 1, wherein the molar ratio of the amount of substrate to be polymerized to that of the magnesium salt is of the order of 1.5.

3. Process according to claim 1, wherein the enzyme is extracted from an *Azotobacter vinelandii* culture.

4. Process according to claim 3, wherein the *Azotobacter vinelandii* culture used is derived from the culture classed under No. 9104 in American Type Culture Collection, 6th edition (1958), Washington D.C.

5. Process according to claim 1, wherein the substrate subjected to the polymerization is constituted by inosine diphosphate.

6. Process according to claim 1, wherein the substrate subjected to the polymerization is constituted by cytidine diphosphate.

7. Process according to claim 1, wherein the substrate subjected to the polymerization is constituted by adenosine diphosphate.

8. Process according to claim 1, wherein the substrate subjected to the polymerization is constituted by uridine diphosphate.

9. Process according to claim 5, including the supplementary step of mixing "Poly I" and "Poly C," in equimolecular proportions, in the midst of an aqueous solution having a sufficient ionic concentration to form a "Poly I:C."

10. Process according to claim 7, including the supplementary step of mixing "Poly A" and "Poly U," in equimolecular proportions in the midst of an aqueous solution having a sufficient ionic concentration to form a "Poly A:U."

11. Process according to claim 9, comprising effecting said mixing in the midst of a solution of sodium chloride comprising a 7.4 pH phosphate buffer, and heating said buffered solution at 37° C. for about one half-hour.

References Cited

Davidson et al.: Progress in Nucleic Acid Research vol. 1, pp. 93–133 (1963).

ALVIN E. TANENHOLTZ, Primary Examiner

U.S. Cl. X.R.

424—180